US012413638B2

(12) United States Patent
Palani et al.

(10) Patent No.: US 12,413,638 B2
(45) Date of Patent: Sep. 9, 2025

(54) INFRASTRUCTURE INTEGRATION FRAMEWORK AND MIGRATION SYSTEM

(71) Applicant: Bank of America Corporation, Charlotte, NC (US)

(72) Inventors: Karthik Rajan Venkataraman Palani, TamilNadu (IN); Thangaselvi Arichandrapandian, TamilNadu (IN)

(73) Assignee: Bank of America Corporation, Charlotte, NC (US)

(*) Notice: Subject to any disclaimer, the term of this patent is extended or adjusted under 35 U.S.C. 154(b) by 42 days.

(21) Appl. No.: 18/427,986

(22) Filed: Jan. 31, 2024

(65) Prior Publication Data
US 2025/0247446 A1 Jul. 31, 2025

(51) Int. Cl.
*H04L 67/1095* (2022.01)
*H04L 41/16* (2022.01)

(52) U.S. Cl.
CPC .......... *H04L 67/1095* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 10,620,947 B2 | 4/2020 | Gavisiddappa Kodigenahalli et al. | |
| 11,194,632 B2 | 12/2021 | Singhal et al. | |
| 11,736,973 B2 * | 8/2023 | Alkurd | H04W 28/0268 370/329 |
| 2013/0054734 A1 | 2/2013 | Bond et al. | |
| 2015/0089063 A1 | 3/2015 | Soni et al. | |
| 2020/0250595 A1 | 8/2020 | Palani | |
| 2021/0075877 A1 | 3/2021 | Miedema et al. | |
| 2022/0172076 A1 * | 6/2022 | Kanza | G06N 3/044 |
| 2023/0021723 A1 | 1/2023 | Karuppannan et al. | |
| 2023/0168887 A1 | 6/2023 | Tamilselvam et al. | |

(Continued)

OTHER PUBLICATIONS

Volnes et al., "To Migrate or Not to Migrate: An Analysis of Operator Migration in Distributed Stream Processing", Nov. 6, 2023, IEEE, IEEE Communications Surveys & Tutorials (vol. 26, Issue: 1, 2024, pp. 670-705) (Year: 2023).*

*Primary Examiner* — Davoud A Zand
(74) *Attorney, Agent, or Firm* — Banner & Witcoff, Ltd.

(57) ABSTRACT

Various aspects of the disclosure relate to infrastructure integration and migration of computing services between different computing infrastructure platforms. A system may utilize artificial intelligence (AI) and/or machine learning (ML) models configured to resolve a problem with allocating services between a monolithic infrastructure and one or more cloud computing systems. The infrastructure integration framework and migration system gathers data from a plurality of sources and consolidating the results in a central database. The infrastructure integration framework and migration system analyzes existing architecture operation of the enterprise network to gather information to be stored in the central database. The AI and/or ML models may be trained using the cloud system information and/or the existing architecture information. Automated predictions are ranked and migration may automatically be initiate by the infrastructure integration framework and migration system when certain threshold conditions are met.

20 Claims, 4 Drawing Sheets

(56) References Cited

U.S. PATENT DOCUMENTS

| | | |
|---|---|---|
| 2023/0216762 A1* | 7/2023 | Shamdani .......... H04L 43/0811 709/224 |
| 2023/0229625 A1 | 7/2023 | Nerurkar |
| 2023/0342131 A1 | 10/2023 | Keezhana et al. |
| 2024/0007414 A1* | 1/2024 | Jain ....................... G06F 9/5088 |

* cited by examiner

INFRASTRUCTURE INTEGRATION FRAMEWORK AND MIGRATION SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to manage its computer systems efficiently, effectively, securely, and uniformly, and particularly manage computing infrastructure allocation to manage system resources more efficiently upon which products and/or services run. For example, enterprise organizations have a challenge in determining, which project can eventually successfully operate efficiently if the software-based service is moved into cloud provider infrastructure for microservices or if the service retains operation in the enterprise network's monolith architecture.

While cloud-based microservice operation may have huge impact in network efficiency and/or infrastructure savings for web and core applications, such cloud-based microservices are not the most computationally efficient choice for all projects. For example, legacy applications that completely rely on batch execution, the integrated upstream and/or downstream system-dependent dependencies results in a complex monolithic network architecture. Replicating a similar networking setup via cloud-based microservices that result in subscribing to multiple services provided via cloud providers cause a new architecture that fails to improve networking efficiencies. Indeed, such cloud-based architectures often result in more expensive frameworks, both in cost and computing resources, when compared with existing the monolithic architecture. As such, when considering factors such as computational cost, performance, resiliency, data security, policy implementations, service connectivity, risk, throughput, and connectivity to existing legacy services, implementing an updatable optimal solution for all provided service cannot be efficiently performed.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes artificial intelligence (AI) and/or machine learning (ML)-based identification of computing resource requirements for services provided via an enterprise network and migrating between cloud-based and monolithic computing infrastructures for such services based on identified resource requirements.

The infrastructure integration framework and migration system may include a full stack with an artificial intelligence (AI) and/or machine learning (ML) solution processing models configured to resolve a problem with allocating services between a monolithic infrastructure and one or more cloud computing systems. The infrastructure integration framework and migration system may perform data gathering as a continuous service performing web scraping on the one or more cloud providers and consolidating the results in a central database. The infrastructure integration framework and migration system may also analyze existing architecture of the enterprise network to gather information to be stored in the central database. The AI and/or ML models may be trained using the cloud system information and/or the existing architecture information. Such information may include service performance information, latency information, input and output communication information, processor runtime information, cost information for cloud computing services, maintenance of existing infrastructure software and hardware, and/or commissioning or decommissioning hardware and/or software on the enterprise network, incident information (e.g., security incidents, runtime error incidents, failure incidents, and the like), and/or other such information.

Aspects of the disclosure relate to computer hardware and software. In particular, one or more aspects of the disclosure generally relate to computer hardware and software for deploying and implementing services between different computing platforms to support efficient computing processes.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
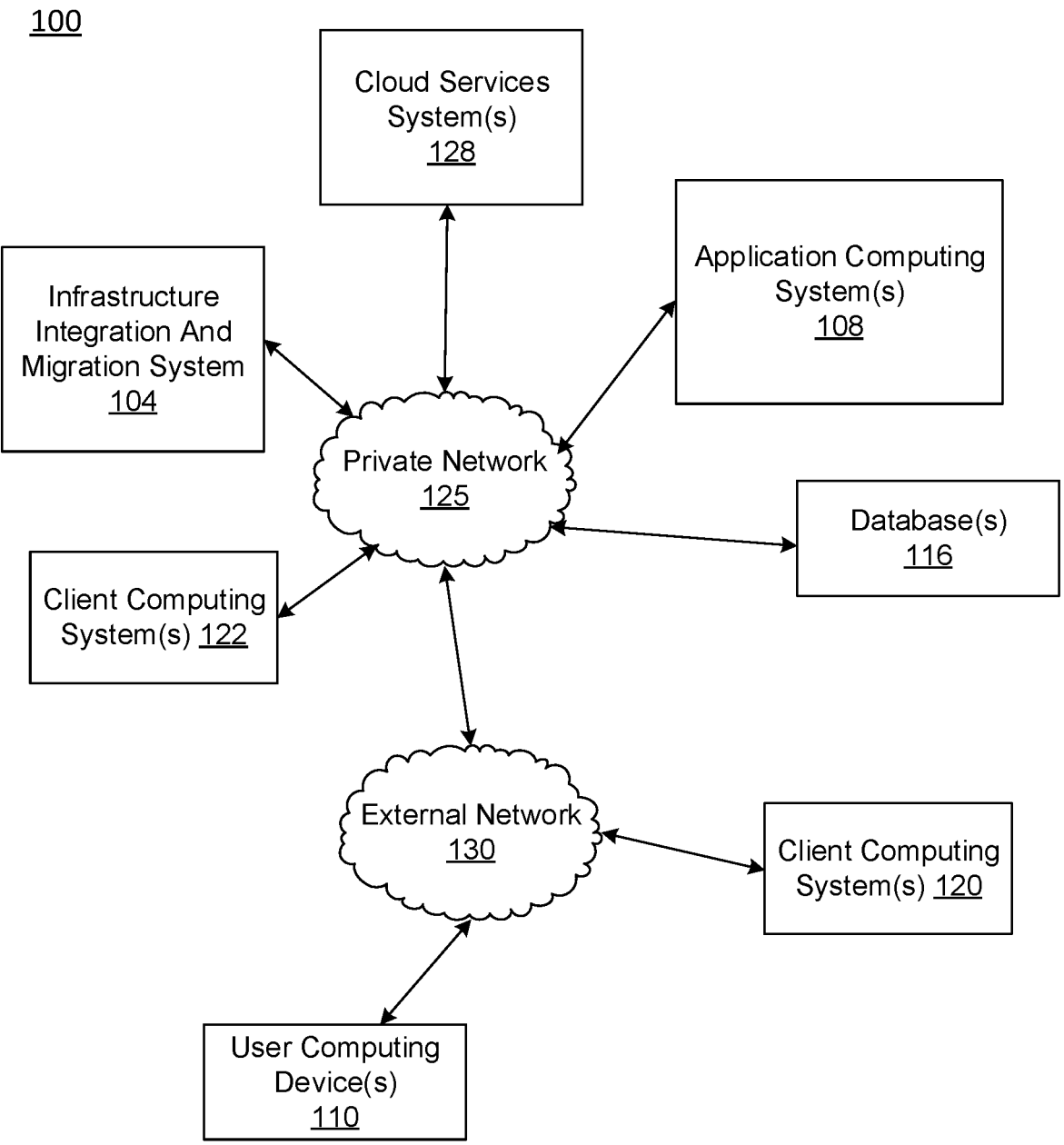
FIG. 1A shows an illustrative computing environment for computing infrastructure integration and migration of services, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The infrastructure integration framework and migration system may include a full stack with an artificial intelligence (AI) and/or machine learning (ML) solution processing models configured to resolve a problem with allocating services between a monolithic infrastructure and one or more cloud computing systems. The infrastructure integration framework and migration system may perform data gathering as a continuous service performing web scraping on the one or more cloud providers and consolidating the results in a central database. The infrastructure integration framework and migration system may also analyze existing architecture of the enterprise network to gather information to be stored in the central database. The AI and/or ML models may be trained using the cloud system information and/or the existing architecture information. Such information may include service performance information, latency information, input and output communication information, processor runtime information, cost information for cloud computing services, maintenance of existing infrastructure software and hardware, and/or commissioning or decommissioning hardware and/or software on the enterprise network, incident information (e.g., security incidents, runtime error incidents, failure incidents, and the like), and/or other such information.

The infrastructure integration framework and migration system may process one or more AI and/or ML models, such as a rule-based model and a machine learning model. The rule-based model may be configured as an enterprise architecture rule model where data is available in the central database along with preconfigured network configurations and designs. The rule-based model may be used to connect tags from a user's input request where the model may process lists of suggested configurations, past issue history, cost history, cost incurrence-based weightings will be derived for various configurations. Output from the rule-based model may be created with scoring values associated with the various possible configurations. The ML model may be an enterprise architecture and/or cloud computing architecture model that may use a combination of model types such as an adaboost model, and a random forest model, and the like. The combination of adaboosting and random forest model process user inputs to process requirements with weightings, service information, pricing information, and issue details, as the features and/or parameters to be trained. The ML model may be used to perform stacking and ranking to boost the accuracy when ranking the most correctly identified sub-model and derive the weightings from those values. This information is used in the final model to predict the recommendation probability of the services to use. Based on the recommendations, configurable weightings may be applied for all cloud architecture models may be given to all for cloud architecture algorithm Model and an architecture ML Model where a top number (N) of predicted system configurations may be shown to a user. Additionally, or alternatively, the infrastructure integration framework and migration system may automatically initiate migration from a first hardware and/or software infrastructure environment to a second hardware and/or software environment such as based on a predicted system configuration meeting a particular threshold condition (e.g., a lowest cost parameter threshold, a lowest computational power use parameter threshold, a computational efficiency parameter threshold, a communication speed parameter threshold, a latency parameter threshold, and the like). For example, a service (e.g., a new release of a service) may be migrated while a current version of the service may remain active, such as to avoid any interruptions to that service. The infrastructure integration framework and migration system may identify analyze operations of a service and/or impacts of changes to that service to identify which infrastructure may be used to operate that service most efficiently and/or in a most cost effective (e.g., least computational cost) manner. In some cases, the infrastructure integration framework and migration system may initiate delivery of code to enable operation of the service in a new computing environment (e.g., a cloud environment, a monolithic environment, and the like), along with configuration information and/or data storage location information. Once delivered, the infrastructure integration framework and migration system may initiate automatic operation of the service in the migrated environment and initiate a wind down of operations of the service in the previous environment to avoid any service interruptions.

In some cases, the infrastructure integration framework and migration system may include a service recommendation system to pass the top N predictions for each of the services to the recommendation system model to predict the next usable service recommendation and/or initiate migration of the service.

The above-described examples and arrangements are merely some examples of arrangements in which the systems described herein may be used. Various other arrangements employing aspects described herein may be used without departing from the innovative concepts described.

FIG. 1A shows an illustrative computing environment 100 for a framework for computing infrastructure integration and migration of services, in accordance with one or more arrangements. The computing environment 100 may comprise one or more devices (e.g., computer systems, communication devices, and the like). The computing environment 100 may comprise, for example, an infrastructure integration and migration system 104, one or more client computing systems 120, one or more cloud service systems 128, one or more application systems 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the infrastructure integration and migration system 104 as a separate computing system, the infrastructure integration and migration system 104 may be integrated into one or more other computing systems such as the application computing systems 108 and/or the client computing systems 122.

The infrastructure integration and migration system 104 may comprise one or more computing devices and/or other computer components (e.g., processors, memories, communication interfaces) configured to perform one or more functions as described herein. Further details associated with the architecture of the infrastructure integration and migration are described with reference to FIG. 1B.

The application computing systems 108 and/or the client computing systems 122 may comprise one or more computing devices and/or other computer components (e.g., processors, memories, communication interfaces) providing one or more services to users. In addition, the application computing systems 108 and/or the client computing systems 122 may be configured to host, execute, and/or otherwise provide one or more enterprise applications or services. In some cases, the application computing systems 108 may host one or more services configured facilitate operations requested through one or more API calls, such as data retrieval and/or initiating processing of specified functionality. In some cases, the client computing systems 122 may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing services, such as an online banking application, fund transfer applications, and/or other programs associated with the financial institution. The application computing systems 108 and/or the client computing systems 122 may comprise various servers and/or databases that store and/or otherwise maintain account information, such as financial account information including account balances, transaction history, account owner information, and/or other information. In addition, the application computing systems 108 and/or the client computing systems 122 may process and/or otherwise execute transactions on specific accounts based on commands and/or other information received from other computer systems comprising the computing environment 100. In some cases, one or more of the application computing systems 108 and/or the client computing systems 122 may be configured, for example, to host, execute, and/or otherwise provide one or more transaction processing programs or services, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 120 may comprise one or more computing devices and/or other computer components (e.g., processors, memories, communication interfaces). The client computing systems 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing systems 120 is for processing an electronic exchange of goods and/or services. The client computing systems 120 may be associated with a specific goods purchasing activity, such as purchasing a vehicle, transferring title of real estate may perform communicate with one or more other platforms within the client computing systems 120. In some cases, the client computing systems 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing systems 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the infrastructure integration and migration system 104. For example, the database(s) 116 may store AI or ML models, performance data for each service, service configuration information, desired performance parameter information, historical performance operation information for each infrastructure (e.g., monolithic architecture, cloud service system 128 architecture, and the like), and the like. In an arrangement, the database(s) 116 may be used for other purposes as described herein. In some cases, the client computing systems 120 may write data or read data to the database(s) 116 via the services. In some cases, the cloud service systems 128 may be communicate directly to the private network 125. In some cases, the cloud service systems may communicate via one or more external networks, such as external network 130. Each cloud service system may offer different performance and/or computational advantages, where characteristic information may be stored in the databases 116 and may be used as parameters by one or more AI or ML models by the infrastructure integration and migration system 104.

In one or more arrangements, the infrastructure integration and migration system 104, the application computing systems 108, the client computing systems 122, the client computing systems 120, the cloud services systems 128, the user devices 110, and/or the other devices/systems in the computing environment 100 may be any type of computing device capable of receiving input via a user interface, and communicating the received input to one or more other computing devices in the computing environment 100. For example, the infrastructure integration and migration system 104, the application computing systems 108, the client computing systems 122, the client computing systems 120, the cloud services systems 128, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the infrastructure integration and migration system 104, the application computing systems 108, the client computing systems 122, the client computing systems 120, the cloud services systems 128, the user devices 110, and/or the other devices/systems in the computing environment 100 may, in some instances, be and/or comprise special-purpose computing devices configured to perform specific functions.

Figure 1B:
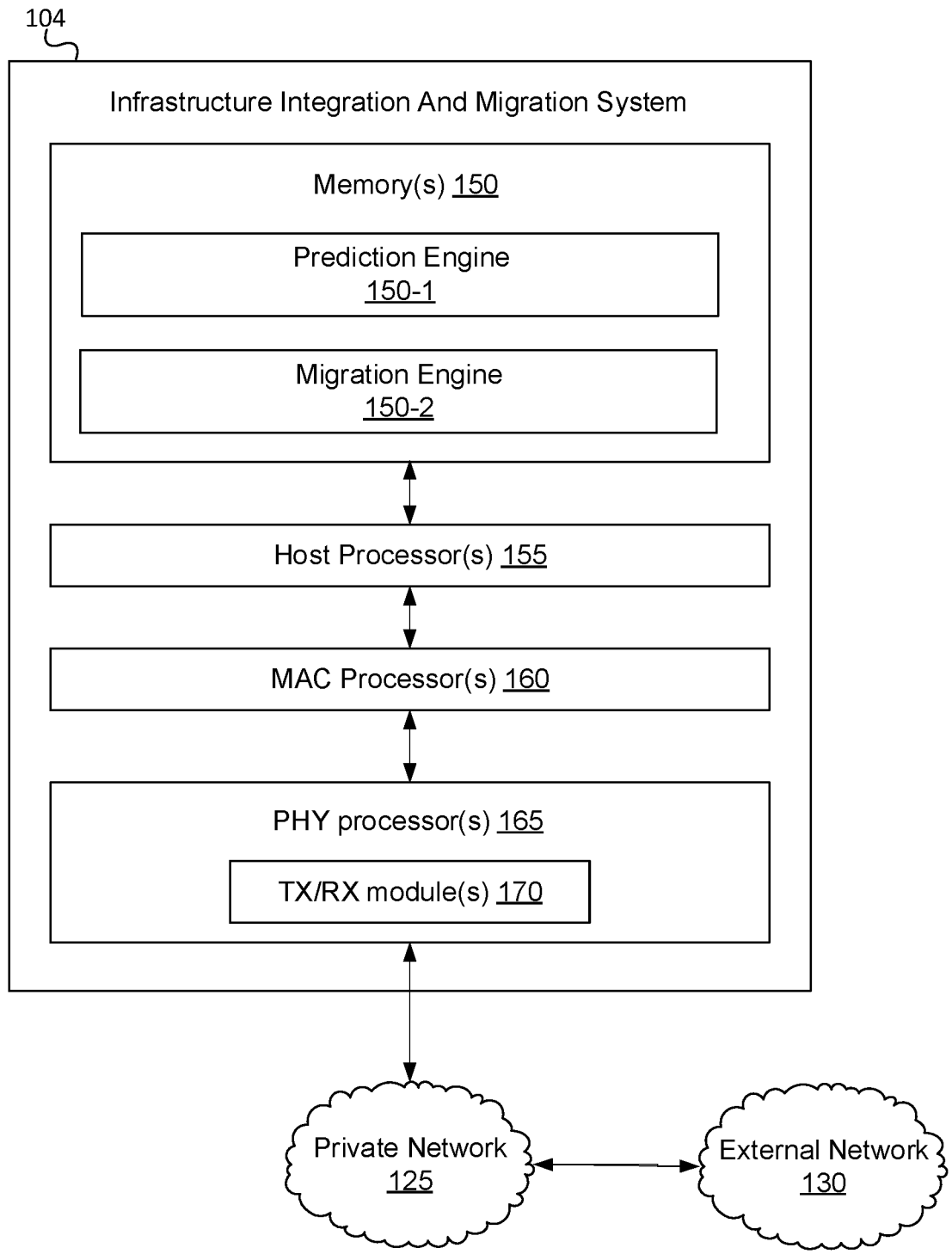
FIG. 1B shows an illustrative computing platform enabled for computing infrastructure integration and migration of services, in accordance with one or more aspects described herein.

FIG. 1B shows an illustrative infrastructure integration and migration system 104 in accordance with one or more examples described herein. The infrastructure integration and migration system 104 may be a stand-alone device and/or may at least be partial integrated with the development computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The infrastructure integration and migration system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the infrastructure integration and migration system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the infrastructure integration and migration system 104 may be configured to execute machine readable instructions stored in memory 150. The memory 150 may comprise (i) one or more program modules/engines having instructions that when executed by the one or more processors cause the infrastructure integration and migration system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the infrastructure integration and migration system 104 and/or by different computing devices that may form and/or otherwise make up the infrastructure integration and migration system 104. For example, the memory 150 may have, store, and/or comprise a prediction engine 150-1, and a migration engine 150-2, and/or the like. The prediction engine 150-1 may have instructions that direct and/or cause the infrastructure integration and migration system 104 to perform one or more operations associated with analyzing operational requirements of one or more services, along with capabilities of each computing infrastructure platform by multiple AI and/or ML models to predict performance operation of each service on each platform, present prediction information to users, and the like. The migration engine 150-2 may have instructions that may cause the infrastructure integration and migration system 104 to identify an optimal infrastructure platform and automatically initiate seamless migration of service operation from the present infrastructure platform to the identified optimal computing platform.

While FIG. 1A illustrates the infrastructure integration and migration system 104 and/or the application computing systems 108, as being separate elements connected in the private network 125, in one or more other arrangements, functions of one or more of the above may be integrated in a single device/network of devices. For example, elements in the infrastructure integration and migration system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application systems 108.

Figure 2:
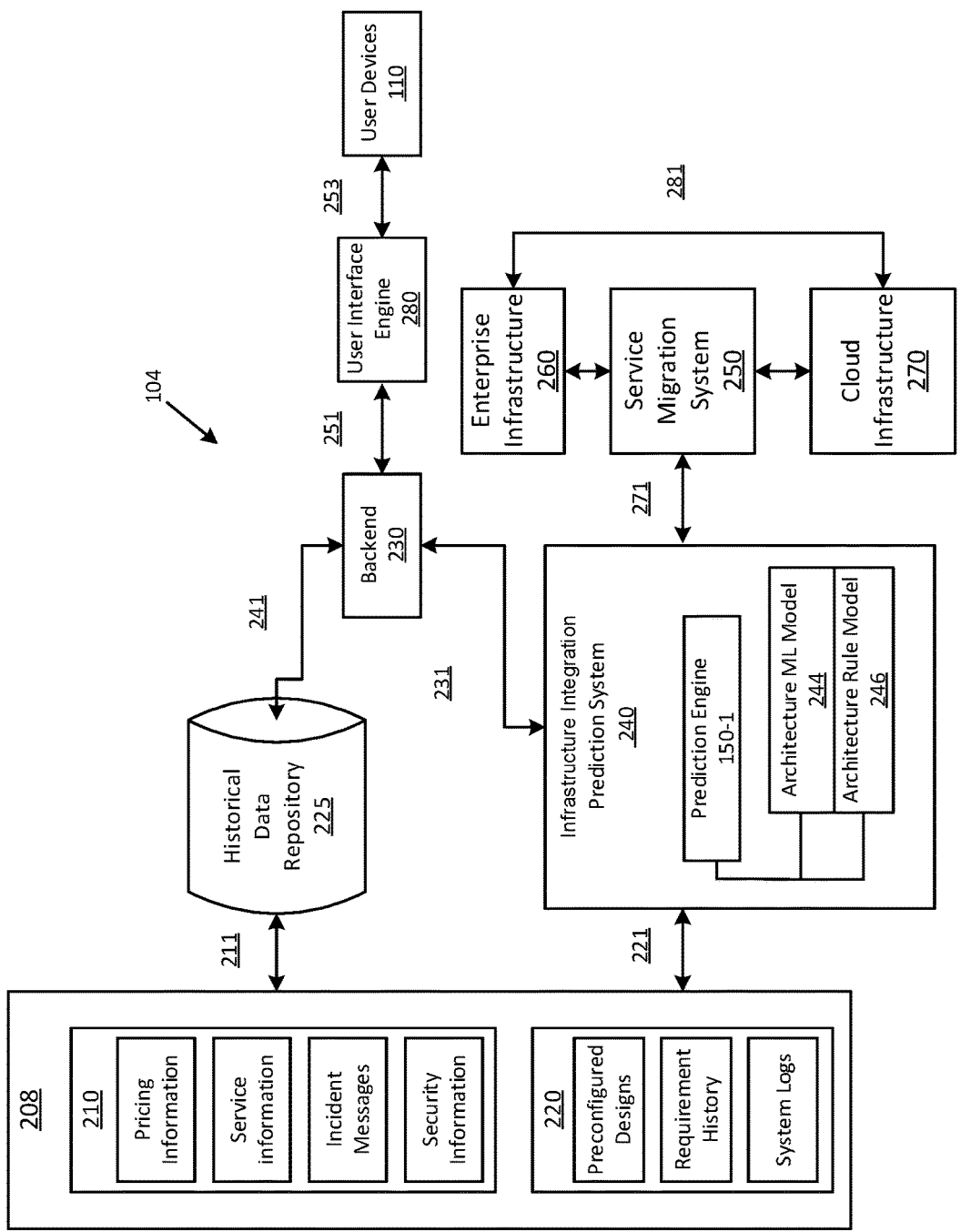
FIG. 2 shows illustrative process for performing service migration and integration in accordance with one or more aspects described herein.

FIG. 2 shows illustrative process for performing service migration and integration in accordance with one or more aspects described herein. The illustrative process may begin at 211 by monitoring information corresponding to an infrastructure computing system and/or one or more cloud computing system operation and/or management. For example, a monitoring system 208 may monitor one or more of the application computing systems 108 and/or client computing systems 120 and 122 to identify information corresponding to computing system operation and/or computing system costs (e.g., monetary costs, computing power costs, and the like). For example, an information management system 210 may parse information identified by the monitory system 208 to identify the information corresponding to computing system operation and/or computing system costs, including, for example, pricing information, service information (e.g., service operation information, latency information, efficiency information, network communication efficiency information and the like), incident messages (e.g., computing error information, data collision information, hardware failure information, firmware error information, software operation error information, and/or the like), and network security information (e.g., identified vulnerability information corresponding to the computing platform upon which the service is running or could be use to run the service, malicious event history information, and the like). Such information may be stored, at 211, in a historical data repository 225 or other database 116 or data repository. Additionally, the monitoring system 208 may include a system requirement monitoring system 220 that may be used to identify one or more preconfigured designs for computing system architecture (e.g., on-site physical infrastructure designs, cloud computing design configuration information, and the like) corresponding to computing infrastructure designs capable of hosting or otherwise operating one or more services or computing applications (e.g., the application computing systems) of the enterprise network, historical, current and/or future application service requirement information for historical, current, or upcoming release versions of one or more products, applications, and/or services operating on the enterprise network, and/or system logs from the current monolithic computing system infrastructure and/or cloud computing systems operating versions of the products, applications and/or services.

The infrastructure integration and migration system 104 may include one or more of the historical data repository 225 (e.g., a database 116), a backend system 230, an infrastructure integration prediction system 240 that may include the prediction engine 150-1 and one or more AI/ML models (e.g., an architecture machine learning model 244, an architecture rule model 246, and the like) for use in predicting which computing platform, or platform type, that may most efficiently process a particular process, service or application provided by the enterprise organization via the enterprise network. At 221, the infrastructure integration prediction system 240 may obtain, automatically, information corresponding to the one or more preconfigured designs for monolithic computing system infrastructure and/or cloud computing systems operating versions of the products, applications and/or services, historical, current and/or future application service requirement information for historical, current, or upcoming release versions of one or more products, applications, and/or services operating on the enterprise network, and/or system logs from the current monolithic computing system infrastructure and/or cloud computing systems operating versions of the products, applications and/or services from the system requirement monitoring system 220, periodically or upon receipt of a triggering event, such as automatically upon a build of a final test version release for an application, product, or service. Other triggering events may be receipt of a system status message indicating an operating efficiency that meets a threshold triggering value (e.g., an operation efficiency percentage under 90%), or the like. The Infrastructure integration prediction system 240 may also receive historical information corresponding to operation of the monolithic computing infrastructure and/or the cloud computing infrastructure system or systems via the backend system 230. This information may include data stored in the historical data repository 225. In some cases, the infrastructure integration prediction system 240 may also store prediction information related to each version of the product, application and/or service operation in relation to both monolithic computing infrastructure and/or cloud computing systems in the historical data repository for use in training models and/or future predictions. The prediction engine 150-1 may process both an architecture ML model 244 and an architecture rule model 246 to predict operational characteristics for a product, application, or service when run in a monolithic computing system or on a cloud computing system.

Because the enterprise organization may operate multiple monolithic infrastructure computing systems capable of operating the product, application, or service, and/or may utilize one or more cloud computing environments (e.g., different vendors, different computing architecture, and the like), the prediction engine 150-1 may predict operational characteristics for each different computing system by each of the architecture ML model 244 and the architecture rule model 246. Predictions may include values for different parameters, such as for system computational cost, contract costs, processor utilization percentages, latency, security risk, and the like. At 251, the backend 230 may trigger a user interface engine 280 to generate and cause display of user interface screens on one or more user devices 110 at 253. The user interface screen may include a presentation of predictions, parameter values (e.g., tabular, drill down windows, and the like), rules and/or model parameter settings. In some cases, the user interface engine 280 may generate comparison pages that highlight differences between the monolithic infrastructure and/or each cloud computing system and highlight positive and negative aspects of each implementation. The user device may return input values including rule set modifications, new model training parameters, and/or selection information for migrating a product, application, or service from a first computing infrastructure to a second computing infrastructure.

At 271, a service migration system 250 may be configured to automatically migrate operations of a product, application, or service between an enterprise monolithic computing infrastructure 260 and a cloud computing infrastructure 270 at 281. In some cases, the migration may be automatically triggered upon meeting a migration parameter threshold or combination of network security thresholds (e.g., a combination of one or more of predicted computational cost parameter values, contract cost parameter values, processor utilization percentage parameter values, latency parameter values, security risk parameter values, and/or the like). In some cases, the migration may be triggered, or overridden, by input received from the user devices 110.

Figure 3:
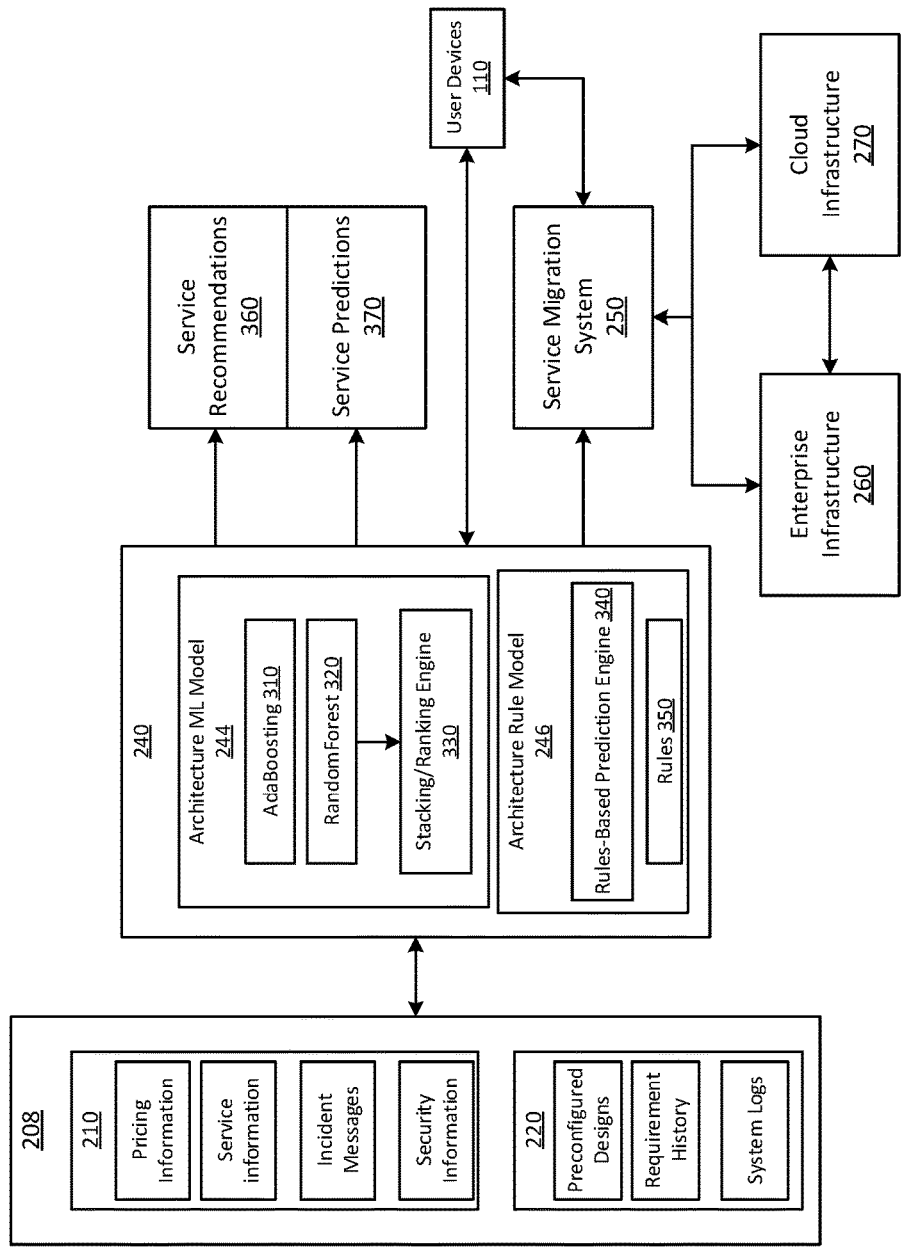
FIG. 3 shows an illustrative system for computing infrastructure integration and migration of services, in accordance with one or more example arrangements.

FIG. 3 shows an illustrative system for computing infrastructure integration and migration of services, in accordance with one or more illustrative arrangements. The architecture ML model 244 may incorporate one or more different machine learning algorithms (e.g., an adaptive boosting (adaboosting) algorithm, a random forest algorithm, and the like) to process information associated with enterprise infrastructure computing systems to generate a stacking with ranking for each computing system to provide a prediction for each monolithic enterprise computing infrastructure environment upon which the product, application, or service may operate. For example, the adaboosting algorithm may utilize an ensemble learning method to increase the efficiency of binary classifiers via an iterative approach to learn from the mistakes of weak classifiers and strengthen each classifier. The random forest algorithm may be used to combine the output of multiple decision trees to reach a single result. Both algorithms may be used to generate predictions for feasibility of use for each monolithic infrastructure to generate a ranked stacking output.

The architecture rule model 246 may incorporate a rules-based prediction engine 340 and one or more rule sets 350 (e.g., a rule set may be defined to set desired operational characteristics for analysis of use of a cloud computing system to operate a product, application, or service). The architecture rule model 246 may automatically process the inputs with respect to the one or more rule sets. The architecture rule model 246 may provide more flexibility than the architecture ML model 244 for the cloud computing systems because the cloud computing infrastructure is often defined by a third-party supplier and is less adaptable to enterprise requirements for each product, service, or application. The overlap of rules may provide additional information to provide flexibility, dependent upon the rule definitions.

The infrastructure integration framework and migration system may include computing functionality to perform cloud data gathering, such as a continuous service performing web scraping on one or more federated cloud providers and consolidating the results in the central database, further used for the model (e.g., the architecture rule model 246) to be trained. Cloud computing service pricing is also another parameter monitored and analyzed by the infrastructure integration framework and migration system. The infrastructure integration framework and migration system may use an application programming interface (API) (e.g., an open source API) for extracting the pricing details from all the available cloud providers. There are two aspects here, one is available products and associated prices. The extraction data may be stored in a computer-readable (e.g., a JavaScript Object Notation (JSON) format, using a query language to automatically generate queries. After extraction, the infrastructure integration framework and migration system may process reports to identify the cost break down and differences, also price trend variation in the same and/or different services. Also, the infrastructure integration framework and migration system build a user interface dashboard to view a summary and these reports in single place and present the dashboard on a user device. By these the users get the best view on the services suggested by the algorithm.

The infrastructure integration framework and migration system may include an incident tracker engine to monitor the different cloud providers, where different pages are used to extract this information. The infrastructure integration framework and migration system performs data cleaning on the extracted information before storing in a historical information database. This incident tracker information is used to design the architecture based on the past and present incidents, the resiliency would also be an important factor considered in prediction by the models.

The infrastructure integration framework and migration system includes a user interface engine that may be used to generate user interfaces presented to users via a user device and to provide information for generating the model, looking the existing models, adding modules, updating generated models, and so on. A dashboard user interface may offer options to select the features need to build the system, and multiple options will be shown by the selected components.

The infrastructure integration framework and migration system may utilize one or more natural language programming algorithms, such as free form text as well, Bidirectional Encoder Representations from Transformers (BERT), or similar models used to for text interpretation. The infrastructure integration framework and migration system may provide optional user interfaces to allow suggestions to be shown to the users and may provide inputs for facilitating user selections. A backend system may process and/or serve the requests generated from the UI and/or autonomously generated within the infrastructure integration framework and migration system and may be designed with micro services and server-less approach. The databases 116 may store both unstructured and structured data.

For the rules-based model, data may be available from the information feeder services and/or available from a database, and/or via preconfigured designs. The infrastructure integration framework and migration system may connect the tags from a user request and may list suggestions and also the issues occur and cost incurred weightage will be given and from there the models will be created with scoring. For the machine learning model, the infrastructure integration framework and migration system may use a combination of models (e.g., Adaboosting and Random Forest) using weightage for the features based on the requirements, such as those provided from the user. The infrastructure integration framework and migration system ML model may then utilize stacking with ranking to boost the accuracy, where ranking of the most correctly identified sub-model and may derive the weightage from that values and used in the final model to predict the recommendation percentage for the services. Output of the infrastructure integration framework and migration system, based on the recommendations, may generate configurable weighting values for all for the rules-based model and the ML model, where a top N results may be shown to the user. In some cases, a top service, when a threshold condition is met, may be automatically migrated from a first infrastructure environment to a recommended infrastructure environment. Additionally, the infrastructure integration framework and migration system may include a cloud service recommendation system to pass the top N predictions for each cloud infrastructure of a plurality of cloud infrastructure environments to the recommendation system model to predict the next usable recommendation.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
a first computing infrastructure system local to an enterprise network and processing a service;
a second computing infrastructure system communicatively coupled to the enterprise network; and
an infrastructure integration framework and migration system comprising:
a processor; and
memory storing computer-readable instructions that, when executed by the at processor, cause the infrastructure integration framework and migration system to:
aggregate service parameter values for each parameter of a plurality of service parameters corresponding to operation of the service within a current computing environment;
generate, via a machine learning model, predicted parameter values for each of the plurality of service parameters corresponding to a monolithic computing infrastructure operating the service;
generate, via a rules-based model, predicted parameter values for each of the plurality of service parameters corresponding to a monolithic computing infrastructure operating the service; and
initiate, automatically based on each predicted parameter value meeting a predetermined threshold, migration of the service from the first computing infrastructure system to the second computing infrastructure system.

2. The system of claim 1, wherein the service parameter values comprise two or more of a lowest cost parameter threshold, a lowest computational power use parameter threshold, a computational efficiency parameter threshold, a communication speed parameter threshold, and a latency parameter threshold.

3. The system of claim 1, wherein the machine learning model comprises a combination of an adaboosting model and a random forest model.

4. The system of claim 3, wherein output of the adaboosting model and the random forest model is stacked and ranked.

5. The system of claim 1, wherein the first computing infrastructure system is a monolithic computing infrastructure and the second computing infrastructure system is a cloud computing infrastructure.

6. The system of claim 1, wherein the first computing infrastructure system is a cloud computing infrastructure and the second computing infrastructure system is a monolithic computing infrastructure.

7. The system of claim 6, wherein the instructions cause the infrastructure integration framework and migration system to present, via a user interface device, a ranked presentation of computing infrastructure environments.

8. A method comprising:
- aggregating service parameter values for each parameter of a plurality of service parameters corresponding to operation of a service within a current computing environment;
- generating, via a machine learning model, predicted parameter values for each of the plurality of service parameters corresponding to a monolithic computing infrastructure operating the service;
- generating, via a rules-based model, predicted parameter values for each of the plurality of service parameters corresponding to a monolithic computing infrastructure operating the service; and
- initiating, automatically based on each predicted parameter value meeting a predetermined threshold, migration of the service from a first computing infrastructure system to a second computing infrastructure system.

9. The method of claim 8, wherein the service parameter values comprise two or more of a lowest cost parameter threshold, a lowest computational power use parameter threshold, a computational efficiency parameter threshold, a communication speed parameter threshold, and a latency parameter threshold.

10. The method of claim 8, wherein the machine learning model comprises a combination of an adaboosting model and a random forest model.

11. The method of claim 10, wherein output of the adaboosting model and the random forest model is stacked and ranked.

12. The method of claim 8, wherein the first computing infrastructure system is a monolithic computing infrastructure and the second computing infrastructure system is a cloud computing infrastructure.

13. The method of claim 8, further comprising presenting, via a user interface device, a ranked presentation of computing infrastructure environments.

14. The system of claim 1, wherein the first computing infrastructure system is a cloud computing infrastructure and the second computing infrastructure system is a monolithic computing infrastructure.

15. An infrastructure integration framework and migration system comprising:
- a processor; and
- memory storing computer-readable instructions that, when executed by the at processor, cause the infrastructure integration framework and migration system to:
  - aggregate service parameter values for each parameter of a plurality of service parameters corresponding to operation of a service within a current computing environment;
  - generate, via a machine learning model, predicted parameter values for each of the plurality of service parameters corresponding to a monolithic computing infrastructure operating the service;
  - generate, via a rules-based model, predicted parameter values for each of the plurality of service parameters corresponding to a monolithic computing infrastructure operating the service; and
  - initiate, automatically based on each predicted parameter value meeting a predetermined threshold, migration of the service from a first computing infrastructure system to a second computing infrastructure system.

16. The infrastructure integration framework and migration system of claim 15, wherein the service parameter values comprise two or more of a lowest cost parameter threshold, a lowest computational power use parameter threshold, a computational efficiency parameter threshold, a communication speed parameter threshold, and a latency parameter threshold.

17. The infrastructure integration framework and migration system of claim 15, wherein the machine learning model comprises a combination of an adaboosting model and a random forest model.

18. The infrastructure integration framework and migration system of claim 17, wherein output of the adaboosting model and the random forest model is stacked and ranked.

19. The infrastructure integration framework and migration system of claim 15, wherein the first computing infrastructure system is a monolithic computing infrastructure and the second computing infrastructure system is a cloud computing infrastructure.

20. The infrastructure integration framework and migration system of claim 15, wherein the instructions cause the infrastructure integration framework and migration system to present, via a user interface device, a ranked presentation of computing infrastructure environments.

* * * * *